No. 800,307. PATENTED SEPT. 26, 1905.
A. DE LASKI & P. D. THROPP.
VEHICLE TIRE.
APPLICATION FILED JULY 11, 1903.

Witnesses:
F. D. Hachenberg,
Henry Thieme.

Inventors
Albert de Laski and
Peter D. Thropp
By Brown & Seward
Their Attorneys

UNITED STATES PATENT OFFICE.

ALBERT DE LASKI AND PETER DUNCAN THROPP, OF TRENTON, NEW JERSEY.

VEHICLE-TIRE.

No. 800,307.      Specification of Letters Patent.      Patented Sept. 26, 1905.

Application filed July 11, 1903. Serial No. 165,097.

*To all whom it may concern:*

Be it known that we, ALBERT DE LASKI and PETER DUNCAN THROPP, citizens of the United States, and residents of Trenton, in the county of Mercer and State of New Jersey, have invented a new and useful Vehicle-Tire, of which the following is a specification.

Our invention relates to vehicle-tires, with the object in view of providing a durable and efficient tire of pneumatic type which will not be liable to creep on the rim of the wheel.

Our invention more particularly contemplates a structure in which an anti-elongating strip is located along the interior of the woven-fabric body of the tire, either along the interior of the inflatable tube which is intended to be inserted within the woven-fabric body or between the exterior of said inflatable tube and the interior of the said woven-fabric body.

Figure 1:
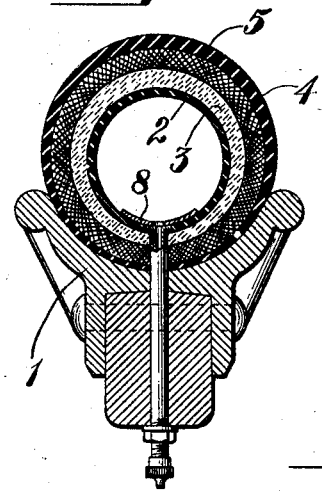
Figure 2:
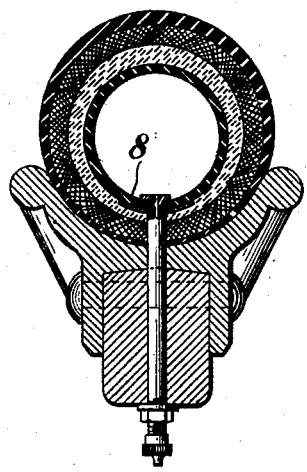
Figure 6:
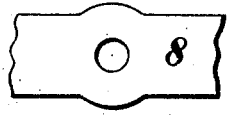
Figure 3:
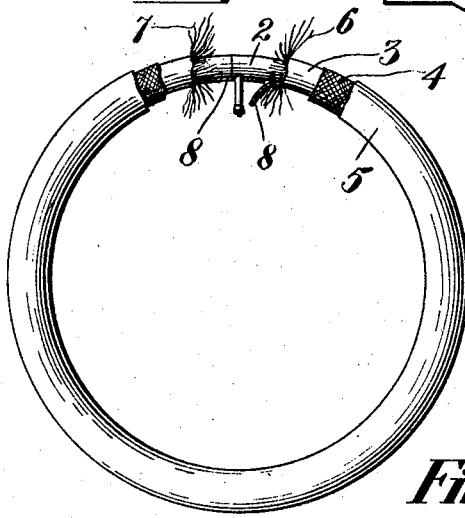
Figure 4:
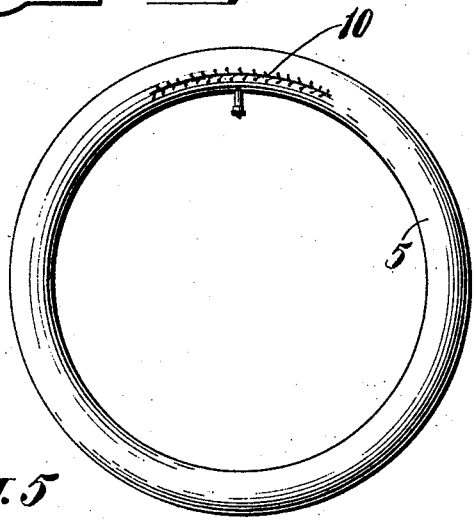
Figure 5:
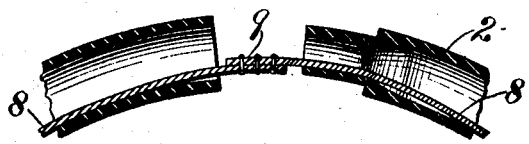

In the accompanying drawings, Figure 1 is a view in transverse section, showing the parts as they appear when in use with the anti-elongating strip on the interior of the inflatable tube. Fig. 2 is a similar view showing the anti-elongating tube between the inner inflatable tube and the fabric body. Fig. 3 represents the manner of introducing the anti-elongating strip between the inner tube and the fabric body before the ends of the fabric body are spliced. Fig. 4 is a view showing the tire split along the side for the purpose of introducing and removing the anti-elongating strip after the tire is completed. Fig. 5 is an enlarged view showing the means of inserting the anti-elongating strip within the inner inflatable tube before its ends are permanently united; and Fig. 6 is an enlarged view in detail of a portion of the anti-elongating strip opposite the valve for inflating the inner tube, showing a hole formed through the strip for the passage of the valve or for the admission of air, as the case may be.

The wheel-rim is denoted by 1. It may be conveniently formed in two annular sections, as is common, for the purpose of introducing the tire into position with one of the sections of the rim in place and then applying the other and bolting them together.

The inner inflatable tube of the tire is denoted by 2, the fabric body by 3, the winding of the exterior of the fabric body by 4, and the outer rubber covering or tread by 5.

The fabric body 3 is preferably a circular woven tubular fabric, and preferably has its ends left with the warp-threads extended, as shown at 6 and 7, Fig. 3, for the purpose of splicing the ends of the tube together to make an annular ring when the inner tube and the anti-elongating strip shall have been introduced, or the ends of the fabric body may be united in any other well-known or approved manner.

The anti-elongating strip is denoted by 8. It preferably consists of a band of steel having its inner face made convex to correspond to the inner wall of the tube, and it is intended to be made of such a length that when its ends are overlapped and united—as, for example, riveted, as shown at 9, Fig. 5—its length will be such as to press the tire firmly to the exterior of the rim.

In assembling the parts of the tire in the manner shown in Fig. 1 the inner tube 2 is first inserted in the circular woven tubular fabric 3 and its ends left slightly apart, as shown in Fig. 5. The anti-elongating strip 8 is then inserted within the inner tube 2 and its ends united. The ends of the inner tube 2 are then made to telescope or overlap and are sealed air-tight. The ends 6 and 7 of the tubular woven fabric are then spliced, completing the annular woven ring exterior to the tube 2. The tube 2 is then inflated, distending the tubular woven fabric and forming a mandrel on which the winding 4, either thread or tape, is applied in the event such winding is desired, and when this winding is completed the outer rubber tread or covering is applied in a manner quite well known in the art. When the anti-elongating strip is to be introduced exterior to the inner tube 2, and yet within the tubular woven fabric, the ends of the inner tube may be united, as shown in Fig. 3, and the anti-elongating strip then introduced between it and the woven tube, its ends secured together, the ends of the woven tube then spliced, the winding applied, and the rubber tread being applied as before. The introduction of the anti-elongating strip within the circular woven tubular-body serves to bind it, as well as all of the parts exterior to the rim, and when introduced within the inner inflatable tube serves to bind it, as well as the other parts, to the rim. This anti-elongating strip instead of being introduced into the unspliced ends of the tube may be introduced through an opening 10 formed in the side of the tire, which opening may also serve for the introduction of the inner tube 2, as well as the anti-elongating strip, and thus provide for the renewal of either the tube or anti-elongating strip whenever occasion may require without disturbing the other parts of the tire save only along the opening 10, which is in a position to be covered by a flange of the rim.

What we claim is—

1. A tire consisting of a circular woven tubular fabric having its ends suitably secured together, threads applied to the exterior of the circular woven tubular fabric, a tread exterior to the threads, an interior inflatable tube and an anti-elongating strip within the circular woven tubular fabric.

2. A wheel-tire including a circular tubular fabric, an inflatable tube located within the tubular fabric and an anti-elongating strip located within the inflatable tube.

In testimony that we claim the foregoing as our invention we have signed our names, in presence of two witnesses, this 8th day of June, 1903.

ALBERT DE LASKI.
PETER DUNCAN THROPP.

Witnesses:
FREDK. HAYNES,
HENRY THIEME.